(12) United States Patent
Nimmo et al.

(10) Patent No.: US 7,848,866 B2
(45) Date of Patent: Dec. 7, 2010

(54) REGULATION OF DRIVING DYNAMICS, FEATURING ADVANCED BUILD-UP OF PRESSURE AT THE WHEEL TO BE REGULATED

(75) Inventors: Matthew Nimmo, Ludwigsburg (DE); Matthias Hey, Wuerzburg (DE)

(73) Assignee: Robert Bosch GmbH, Stuttgart (DE)

( * ) Notice: Subject to any disclaimer, the term of this patent is extended or adjusted under 35 U.S.C. 154(b) by 922 days.

(21) Appl. No.: 10/581,728

(22) PCT Filed: Oct. 22, 2004

(86) PCT No.: PCT/DE2004/002357

§ 371 (c)(1), (2), (4) Date: Mar. 29, 2007

(87) PCT Pub. No.: WO2005/054022

PCT Pub. Date: Jun. 16, 2005

(65) Prior Publication Data

US 2007/0282510 A1    Dec. 6, 2007

(30) Foreign Application Priority Data

Dec. 3, 2003  (DE) ................................ 103 56 510

(51) Int. Cl.
*B60T 8/00* (2006.01)

(52) U.S. Cl. ........................................ 701/70; 303/189
(58) Field of Classification Search ................... None
See application file for complete search history.

(56) References Cited

U.S. PATENT DOCUMENTS

| 6,149,251 A |   | 11/2000 | Wuerth et al. |
| 6,416,141 B1 | * | 7/2002 | Zinnkann et al. ............ 303/191 |
| 6,493,621 B2 | * | 12/2002 | Tamura et al. ................ 701/70 |

FOREIGN PATENT DOCUMENTS

| DE |   3423063 A1 | * | 1/1996 |
| DE | 100 54 647 |   | 5/2002 |
| DE | 101 19 907 |   | 10/2002 |

* cited by examiner

*Primary Examiner*—Michael J. Zanelli
(74) *Attorney, Agent, or Firm*—Kenyon & Kenyon LLP

(57) ABSTRACT

A method for improving the efficiency of a driving dynamics regulating system which intervenes in the driving operation in critical driving situations by automatic braking intervention at selected wheels. It is possible for the reaction speed of the brake system 3 to be considerably increased if, before the actual regulating intervention, the imminent critical driving situation is already detected and a slight preparatory brake pressure is already built up at least one wheel at which a future regulating intervention is expected.

12 Claims, 3 Drawing Sheets

22

REGULATION OF DRIVING DYNAMICS, FEATURING ADVANCED BUILD-UP OF PRESSURE AT THE WHEEL TO BE REGULATED

FIELD OF THE INVENTION

The present invention relates to a method for regulating driving dynamics in critical driving situations and to a corresponding device.

BACKGROUND INFORMATION

Driving dynamics regulation serves to assist the driver in critical driving situations and to automatically stabilize the vehicle again. Known driving dynamics regulating systems, such as ESP (electronic stability program) or ROM (rollover mitigation), usually make use of the brakes of the vehicle or the engine management system as correcting elements in order to intervene in the driving operation. Other systems also use, for example, an active suspension/shock absorber system (normal force distribution system) or active steering.

Driving dynamics regulation, such as ESP, regulates in most cases the yaw velocity of the vehicle, i.e. the rotation of the vehicle about the vertical axis. When a vehicle oversteers or skids, the yaw velocity is higher than it ought to be based on the driver's inputs (steering wheel angle, accelerator pedal position, brake actuation). In order to stabilize the vehicle, the regulating algorithm calculates a compensating yawing moment which is implemented by activating selected wheel brakes. The regulating algorithm usually specifies for this a braking torque in the form of desired slip for individual wheels which is set using a brake-slip controller.

For setting a suitable compensating yawing moment in the case of oversteering, the wheel on the outside of the curve is particularly suitable. That wheel exhibits a favorable lever arm with respect to the center of gravity of the vehicle and is also capable of transmitting a high force based on a typical chassis configuration.

Driving dynamics regulating systems having a tipping stabilization function, such as ROM, also typically act, by braking interventions, on the front wheel on the outside of the curve. That wheel is in most cases under a high load and therefore greatly contributes to the development of high and potentially critical lateral acceleration.

In highly dynamic maneuvers, for example lane-changing or fishhook maneuvers, the vehicle typically enters a critical driving condition when the first counter-steering movement is performed. In that instance, on the one hand, high lateral acceleration may occur, causing a situation in which particularly vehicles with a high center of gravity may enter a critical range as regards tipping. On the other hand, a high degree of oversteer may also occur at that time. Braking torque intervention in the front wheel on the outside of the curve accordingly helps in highly dynamic maneuvers both to prevent tipping and to prevent oversteer.

Known driving dynamics regulating systems normally intervene in the driving operation when the control deviation of the yaw velocity exceeds a predefined regulation commencement threshold. When the regulation commencement threshold is exceeded, a correction request is sent to the hydraulic brake system, or rather to a hydraulic pump of the brake system, and various valves of a hydraulic unit are activated by the control unit.

Owing to various delaying factors, for example ramp-up of the hydraulic pump to nominal speed or filling of the brake with brake fluid, etc., it is possible for the brake pressure to be built up only with a finite gradient, however, with the result that the desired target braking torque is obtained only after a predefined period of time which is dependent on the brake system. That delay time may mean that, especially in highly dynamic maneuvers, vehicles may go into a skid and not be stabilized sufficiently quickly. Particularly in the case of vehicles with a high center of gravity, such as vans or SUVs (sports utility vehicles), the delayed response behavior of the brake system may lead to very high lateral acceleration which causes the vehicle to overturn.

SUMMARY OF THE INVENTION

An object of the present invention to improve a driving dynamics regulating system in such a way that vehicles in critical driving situations may be stabilized more rapidly and prevented from overturning.

An important aspect of the present invention is to detect the imminence of an automatic braking intervention at a wheel even before the actual regulating intervention is triggered and to build up a slight preparatory brake pressure at that wheel. By already detecting an imminent critical driving condition before the actual regulating intervention and by building up a slight preparatory pressure at at least one wheel at which a future regulating intervention is expected it is possible for the reaction speed of the brake in question to be considerably increased. That measure thus has the effect that the brake system is already "pre-loaded", and has the considerable advantage that the response time of the brake system to a correction request is considerably shorter and therefore better stabilization of the vehicle is possible.

The imminence of a critical driving situation (in which a regulating intervention takes place) may in principle be deduced from any condition variables that individually or in combination provide an indication of an imminent regulating intervention. A shortly imminent critical driving situation may be detected, for example, by the fact that the yaw velocity greatly increases, i.e. the gradient of the yaw velocity exceeds a predefined threshold value and/or the control deviation of the yaw velocity exceeds a predefined threshold value (which is lower than the regulation commencement threshold for the actual stabilization intervention). A shortly imminent regulating intervention may also be detected by evaluating and monitoring other characteristic driving condition variables, such as lateral acceleration and/or change therein, steering speed, etc.

The application of a preparatory brake pressure in accordance with the present invention is preferably employed in highly dynamic lane-changing maneuvers, for example in so-called fishhook maneuvers, RER (road edge recovery) maneuvers or the test used by the German Automotive Industry Association (VDA)—the so-called VDA test (moose test). It is characteristic of those maneuvers that a first steering maneuver, with which the vehicle is steered out of a lane, and a second steering maneuver, with which the vehicle is oriented in the original direction of travel (but displaced to the side) by steering in the opposite direction, take place within a short period of time. This frequently results in skidding of the vehicle after the second steering maneuver. It is therefore proposed that preferably the front wheel that is on the inside of the curve during the first steering maneuver be acted upon by preparatory brake pressure preferably even before the steering has gone beyond the original position (i.e. the position of the steering wheel before the first steering maneuver was initiated). During the second steering maneuver, the front wheel that was originally on the inside of the curve then forms the front wheel that is on the outside of the curve and at which the actual wheel slip regulation takes place.

Preparatory loading of the brake of the front wheel that is on the inside of the curve has the disadvantage that an additional oversteering yawing moment acts on the vehicle during the first steering maneuver. It is therefore sensible to set the preparatory brake pressure such that it is only so great or so weak that the driving behavior is not unduly affected. The considerable advantage of that preparatory measure, however, is that it is possible for the vehicle to be stabilized again considerably more rapidly after the second steering maneuver since the front wheel brake is already pre-loaded.

In a highly dynamic lane-changing maneuver, the preparatory brake pressure is preferably built up on condition that the lateral acceleration of the vehicle is great in magnitude and the steering speed is less than zero (i.e. a steering movement in the direction of the neutral position is taking place) and falls below a predefined threshold value. Steering speed is defined here as the change in the steering angle over time, being negative when the size of the steering angle decreases and being positive if the size of the steering angle increases.

Dynamic lane-changing maneuvers are characterized especially by very rapid steering maneuvers that follow one another in quick succession and may accordingly be detected, for example, by the fact that a first steering maneuver which meets a first condition with regard to the transverse dynamics of the vehicle and a second steering maneuver in the opposite direction and meeting a second condition take place within a predefined time. The associated threshold values, for example for lateral acceleration, change in lateral acceleration, or steering speed, are preferably set such that it is possible to differentiate between a lane change in the course of an overtaking maneuver and a lane change due to a critical driving situation.

The function for applying the preparatory brake pressure is preferably deactivated when a predefined condition has been met, for example the driving dynamics regulating system requests braking intervention and increases the brake pressure at selected wheels. The function may also be deactivated when, for example, only slow steering movements take place over a predefined period of time, i.e. the magnitude of the steering speed during a predefined time is smaller than a predefined threshold value.

A further deactivation condition for the preparatory brake pressure may, for example, be that the preparatory brake pressure has been maintained for longer than a predefined period without a regulating intervention by the driving dynamics regulating system having taken place.

DETAILED DESCRIPTION

Figure 1:
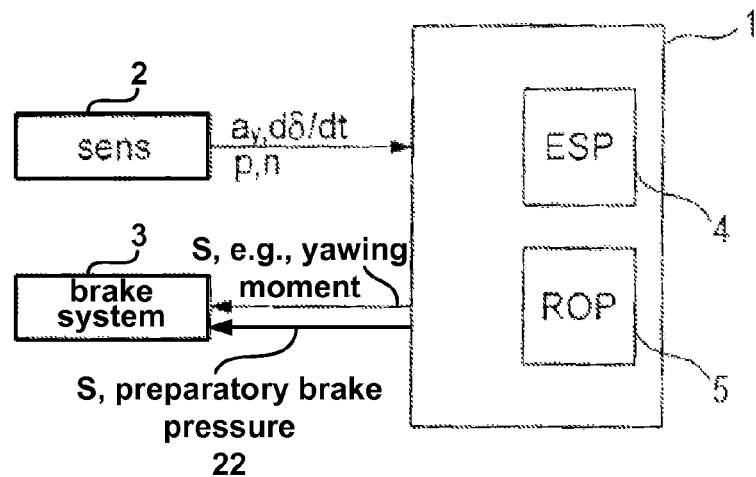
FIG. 1 shows a schematic block diagram of a driving dynamics regulating system, according to an example embodiment of the present invention.

FIG. 1 is a schematic illustration of a driving dynamics regulating system 1-5. The latter includes a sensor system for registering various driving condition variables from which the actual behavior of the vehicle is determined. All of the sensors of the system are combined in a block 2. The latter includes, for example, a lateral acceleration sensor, wheel revolution speed sensors for determining driving speed, a steering wheel sensor, a brake pressure sensor etc. The driving dynamics regulating system further includes a control unit 1 in which various regulating algorithms may be stored. In the example under consideration, the regulating system includes an algorithm ESP 4 for regulating yaw velocity and an algorithm ROP 5 (roll-over protection) with which the maximum lateral acceleration of the vehicle is restricted in order to prevent overturning of the vehicle.

In a critical driving situation in which the vehicle oversteers or threatens to tilt about a longitudinal axis, regulating algorithms 4 and 5 calculate a compensating yawing moment in order to stabilize the vehicle. The required compensating yawing moment is applied by wheel brakes 3 to selected wheels, the wheel slip being regulated.

To set the predefined target brake pressure or target braking torque, control unit 1 activates a hydraulic pump and various valves (not shown) in brake system 3. In order to avoid a delay due to ramp-up of the hydraulic pump and filling of the brake with brake fluid, a preparatory brake pressure 22 (see FIG. 4) is already applied to that wheel brake at which a future regulating intervention is expected, before the actual regulating intervention. As a result of that anticipatory control measure, the brake system is already "pre-loaded" and is normally able to react and set the desired target braking torque considerably more rapidly.

The magnitude of the preparatory brake pressure is preferably such that the vehicle is not significantly affected with regard to its driving behavior by the preparatory brake pressure. Depending on the type of vehicle, the preparatory brake pressure may, for example, assume values between 20 and 50 bar.

The preparatory brake pressure may be built up as a precaution, for example, in a cornering movement in which the vehicle oversteers or in a lane-changing maneuver, for example a fishhook maneuver, a VDA test (moose test) or an RER maneuver.

Activation and deactivation of the preparatory brake pressure in a lane-changing maneuver will be explained in detail and by way of example below with reference to FIG. 2.

Figure 2:
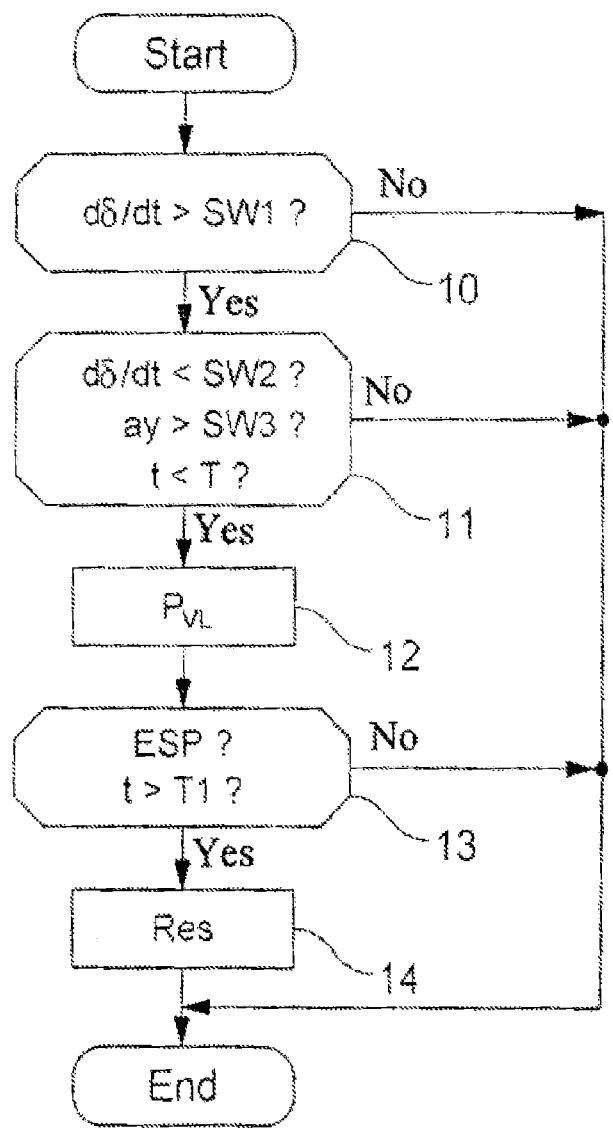
FIG. 2 shows a flow diagram to illustrate the fundamental steps of the method for building up a preparatory brake pressure.

FIG. 2 shows the fundamental steps of a method for regulating driving dynamics, featuring advanced build-up of pressure at at least one selected wheel in a lane-changing maneuver. Dynamic lane-changing maneuvers are characterized by two steering movements occurring in quick succession, with which the vehicle is initially steered out of the lane in a first steering maneuver and is then oriented in the original direction of travel again by a second steering maneuver. Particularly after the second steering maneuver, oversteering and skidding of the vehicle may occur.

In order to detect such a driving situation, in step 10 it is first examined whether the steering speed $d\delta/dt$ is greater than zero and exceeds a predefined threshold value SW1. If that is the case (Y), this indicates a very rapid, violent steering movement, which differs from a normal overtaking maneuver.

In step 11 it is then examined whether a further steering maneuver is carried out in the opposite direction within a predefined time T (query t<T). In addition, it is examined whether the second steering maneuver meets predefined conditions regarding the transverse dynamics of the vehicle. One of those conditions is that the lateral acceleration $a_y$ exceeds a predefined threshold value SW3. The other condition is that the steering speed $d\delta/dt$ is less than zero (i.e. a steering movement is being made in the direction towards the neutral position) and falls below a threshold value SW2.

If the second steering maneuver takes place within the predefined time T (case Y), in step 12 the preparatory brake pressure is built up at the wheel at which a regulating intervention by the driving dynamics regulating system is expected. This is left front wheel 7 in FIG. 3. If the activation conditions of block 11 are not met (N), the procedure ends.

After the preparatory brake pressure has been built up, in block 13 various deactivation conditions are examined. If one of the deactivation conditions is met, the function is deactivated again. One possible deactivation condition is that the ESP requests a regulating intervention and, for example, activates the hydraulic pump accordingly. If no regulating intervention takes place within a predefined time period T1, the preparatory brake pressure is reduced again.

If one of the deactivation conditions of block 13 is met, in block 14 the preparatory braking function is reset. That ends the procedure.

Figure 3:
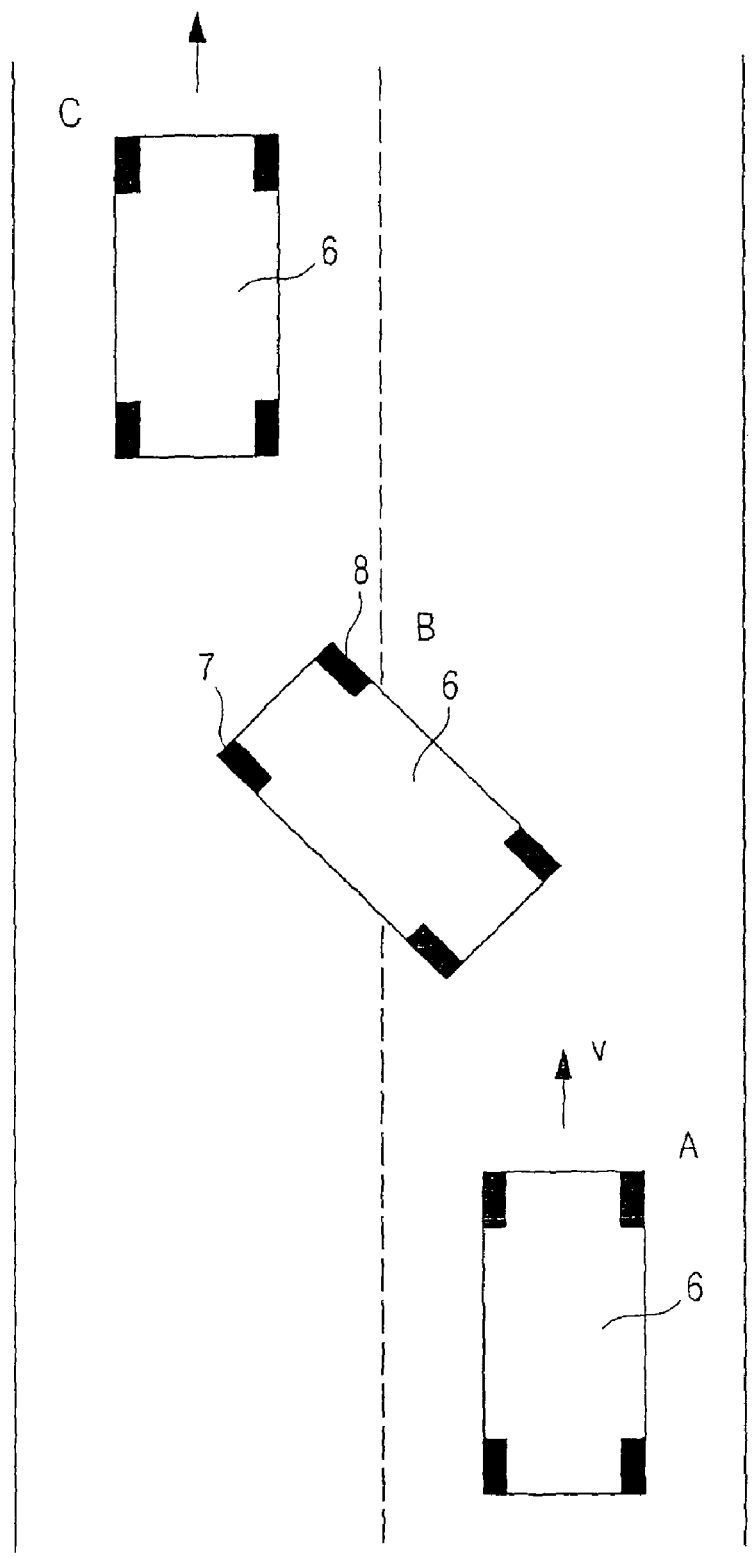
FIG. 3 shows various phases during a lane-changing maneuver.
Figure 4:
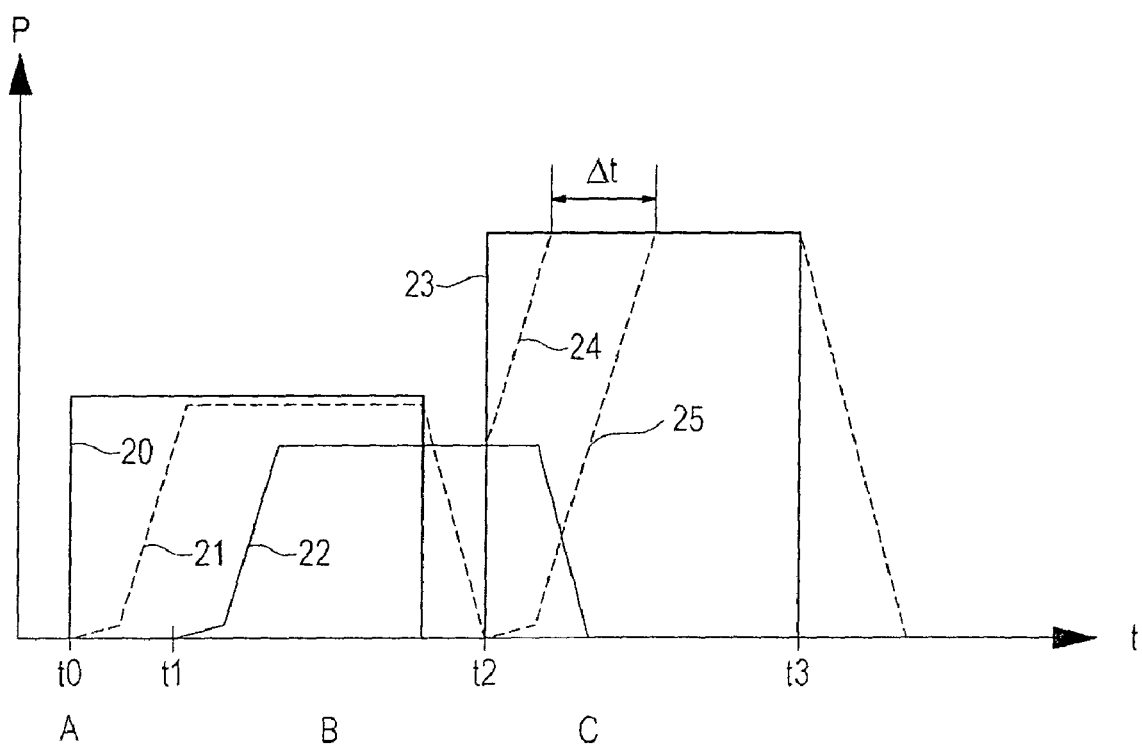
FIG. 4 shows the gradient of the brake pressure at various wheels of the vehicle during a lane-changing maneuver.

FIG. 3 shows various phases of a vehicle during a lane-changing maneuver. In phase A, vehicle 6 travels at a speed v in a straight line in the right-hand lane. Starting from that driving situation, the driver abruptly steers to the left into the other lane. A regulating threshold of the ROP or ESP algorithm is thereby exceeded, with the result that control unit 1 emits an activation signal 20 (see FIG. 4) for the wheel brake of right front wheel 8. Owing to the inertia of the brake system, the actual brake pressure (signal 21; FIG. 4) builds up only after a delay time which is inherent in the system.

Even before the illustrated driving condition B is reached, the driver begins to counter-steer, whereupon the triggering conditions mentioned in block 12 regarding lateral acceleration $a_y$ and steering speed $d\delta/dt$ are met. At the time t1 (FIG. 4), a preparatory brake pressure 22 of a low level is therefore built up at left front wheel 7.

After exceeding driving condition B, vehicle 6 steers in a curve to the right in which the regulating threshold of the driving dynamics regulating system (ROP or ESP) is exceeded at the time t2 and the regulating system issues a pressure build-up request 23 for the wheel brake of left front wheel 7 in order to stabilize vehicle 6. Since brake system 3 is already pre-loaded, it is possible for that request to be put into effect within a very short time (see pressure gradient 24). Without the precautionary build-up of pressure at left front wheel 7 the target brake pressure demanded would be applied to left front wheel brake 7 only with a delay of duration $\Delta t$ (see pressure gradient 25). The reaction time of the driving dynamics regulating system has therefore improved by a time period $\Delta t$. As a result, it is possible to intercept and stabilize the vehicle considerably earlier, which considerably improves driving safety especially in highly dynamic maneuvers.

List of reference numerals 1  control unit
2  sensor system
3  brake system
4  ESP algorithm
5  ROP algorithm
6  vehicle
7  left front wheel
8  right front wheel
10-14  steps of the method
20  ROP or ESP pressure requirement front right
21  actual pressure gradient front right
22  preparatory brake pressure front left -continued List of reference numerals 23  ROP or ESP pressure requirement front left
24  actual pressure gradient front left with preparatory brake pressure
25  actual pressure gradient front left without preparatory brake pressure
t0-t3  points in time
A,B,C  driving conditions
V  vehicle speed
$a_y$  lateral acceleration
$d\delta/dt$  steering speed
S  control signal

What is claimed is:

1. A method for stabilizing a vehicle in a critical driving situation, comprising:
   detecting the critical driving situation by a sensor system;
   causing a regulating algorithm to intervene in a driving operation of the vehicle under a predefined condition using a brake system;
   determining and monitoring a lateral acceleration of the vehicle and a steering speed in relation to threshold values; and
   before a stabilization intervention, building up a preparatory brake pressure of a low level at a wheel brake of a wheel at which the stabilization intervention is shortly expected;
   wherein the preparatory brake pressure is built up if the lateral acceleration of the vehicle exceeds a first predefined threshold value and the steering speed falls below a second predefined threshold value.

2. The method as recited in claim 1, wherein the preparatory brake pressure is built up during a lane-changing maneuver, in which a first steering maneuver and a second steering maneuver in the opposite direction take place within a predefined time, if, in the second steering maneuver, the lateral acceleration is greater than a predefined threshold value and the steering speed falls below a threshold value.

3. The method as recited in claim 2, wherein the first steering maneuver has a lateral acceleration and a steering speed that each exceeds a respective one of the first predefined threshold value and the second predefined threshold value.

4. The method as recited in claim 1, further comprising:
   deactivating the building up the preparatory brake pressure if a predefined deactivation condition is met.

5. The method as recited in claim 4, wherein the deactivation condition is a signal of the regulating algorithm with which a braking intervention is requested.

6. A method for stabilizing a vehicle in a critical driving situation, comprising
   detecting the critical driving situation by a sensor system;
   causing a regulating algorithm to intervene in a driving operation of the vehicle under a predefined condition using a brake system;
   before a stabilization intervention, building up a preparatory brake pressure of a low level at a wheel brake of a wheel at which the stabilization intervention is shortly expected; and
   deactivating the building up the preparatory brake pressure if a predefined deactivation condition is met;
   wherein the deactivation condition is a signal of the regulating algorithm with which a braking intervention is requested and that a change in a steering angle over a predefined time is smaller than a predefined threshold value.

7. A driving dynamics regulating system for stabilizing a vehicle in a critical driving situation, comprising:

a sensor system for registering variables describing a driving condition;

a brake system for performing a stabilization intervention in a driving operation of the vehicle under a predefined condition, in accordance with a regulating algorithm; and a control unit configured to execute the regulating algorithm to:

determine and monitor a lateral acceleration of the vehicle and a steering speed in relation to threshold values; and before the stabilization intervention, build up a preparatory brake pressure of a low level at a wheel brake of a wheel at which the stabilization intervention is shortly expected;

wherein the preparatory brake pressure is built up if the lateral acceleration of the vehicle exceeds a first predefined threshold value and the steering speed falls below a second predefined threshold value.

8. The driving dynamics regulating system as recited in claim 7, wherein the preparatory brake pressure is built up during a lane-changing maneuver, in which a first steering maneuver and a second steering maneuver in the opposite direction take place within a predefined time, if, in the second steering maneuver, the lateral acceleration is greater than a predefined threshold value and the steering speed falls below a threshold value.

9. The driving dynamics regulating system as recited in claim 8, wherein the first steering maneuver has a lateral acceleration and a steering speed that each exceeds a respective one of the first predefined threshold value and the second predefined threshold value.

10. The driving dynamics regulating system as recited in claim 7, wherein the control unit is configured to deactivate the building up the preparatory brake pressure if a predefined deactivation condition is met.

11. The driving dynamics regulating system as recited in claim 10, wherein the deactivation condition is a signal of the regulating algorithm with which a braking intervention is requested.

12. A driving dynamics regulating system for stabilizing a vehicle in a critical driving situation, comprising:

a sensor system for registering variables describing a driving condition;

a brake system for performing a stabilization intervention in a driving operation of the vehicle under a predefined condition, in accordance with a regulating algorithm; and a control unit configured to execute the regulating algorithm to:

before the stabilization intervention, build up a preparatory brake pressure of a low level at a wheel brake of a wheel at which the stabilization intervention is shortly expected; and deactivate the build up the preparatory brake pressure if a predefined deactivation condition is met;

wherein the deactivation condition is a signal of the regulating algorithm with which a braking intervention is requested and that a change in a steering angle over a predefined time is smaller than a predefined threshold value.

\* \* \* \* \*